Dec. 15, 1970    R. C. FISHER    3,546,820

MACHINE TOOL WITH UPWARDLY URGED SLIDE

Filed Nov. 9, 1967    9 Sheets-Sheet 1

INVENTOR.
ROBERT C. FISHER
BY Pearce Schaeperklaus

Attorneys

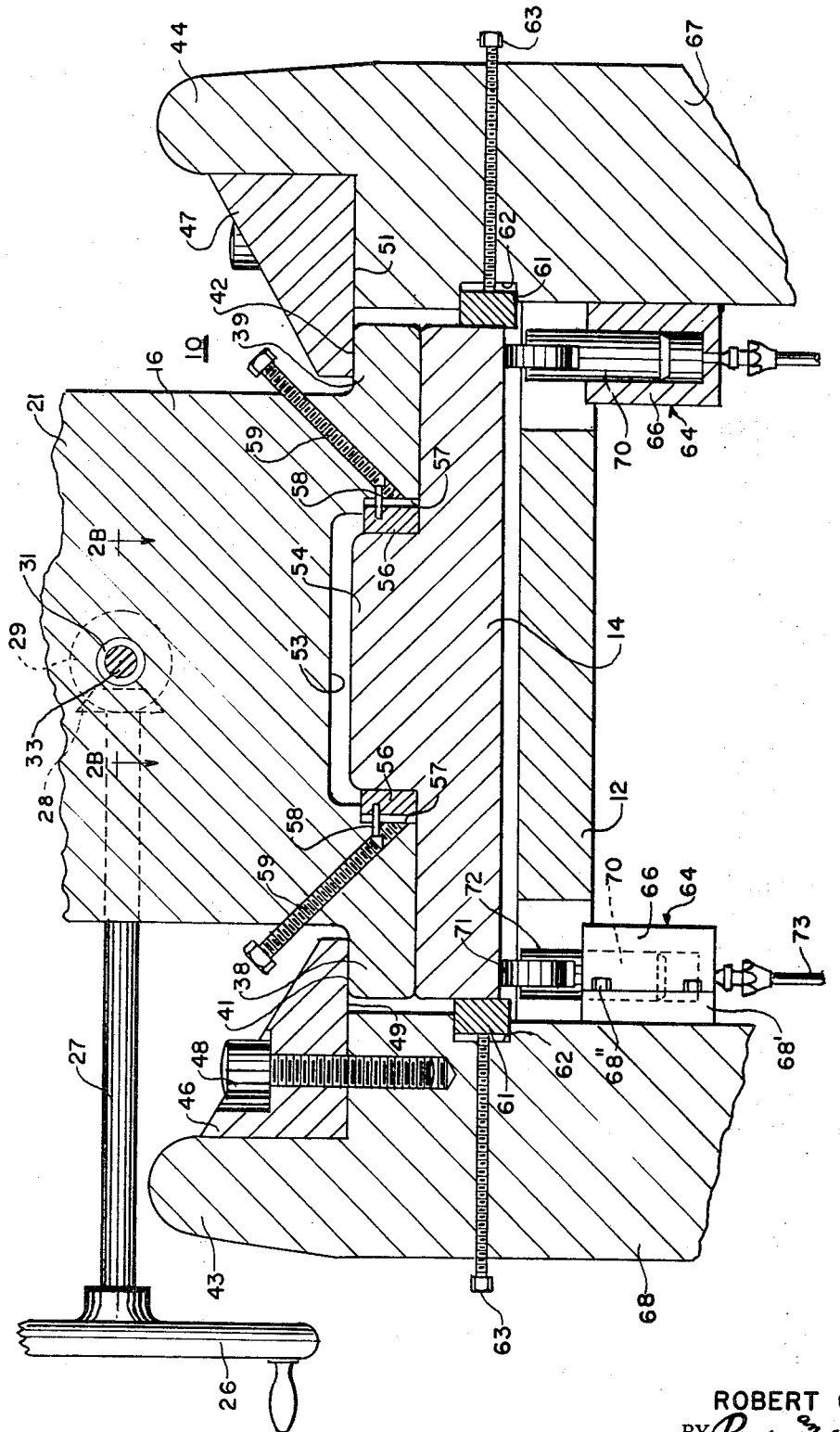

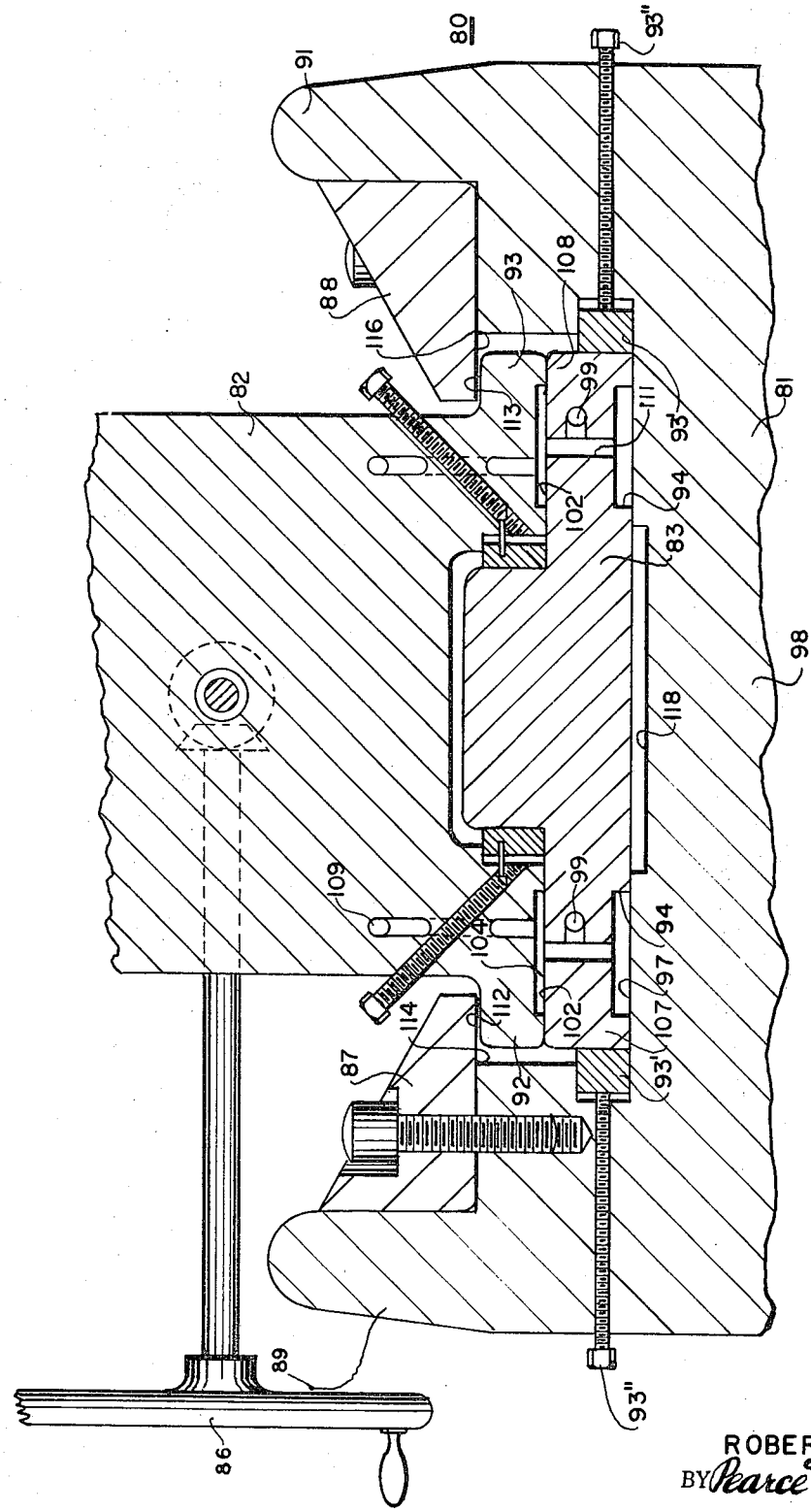

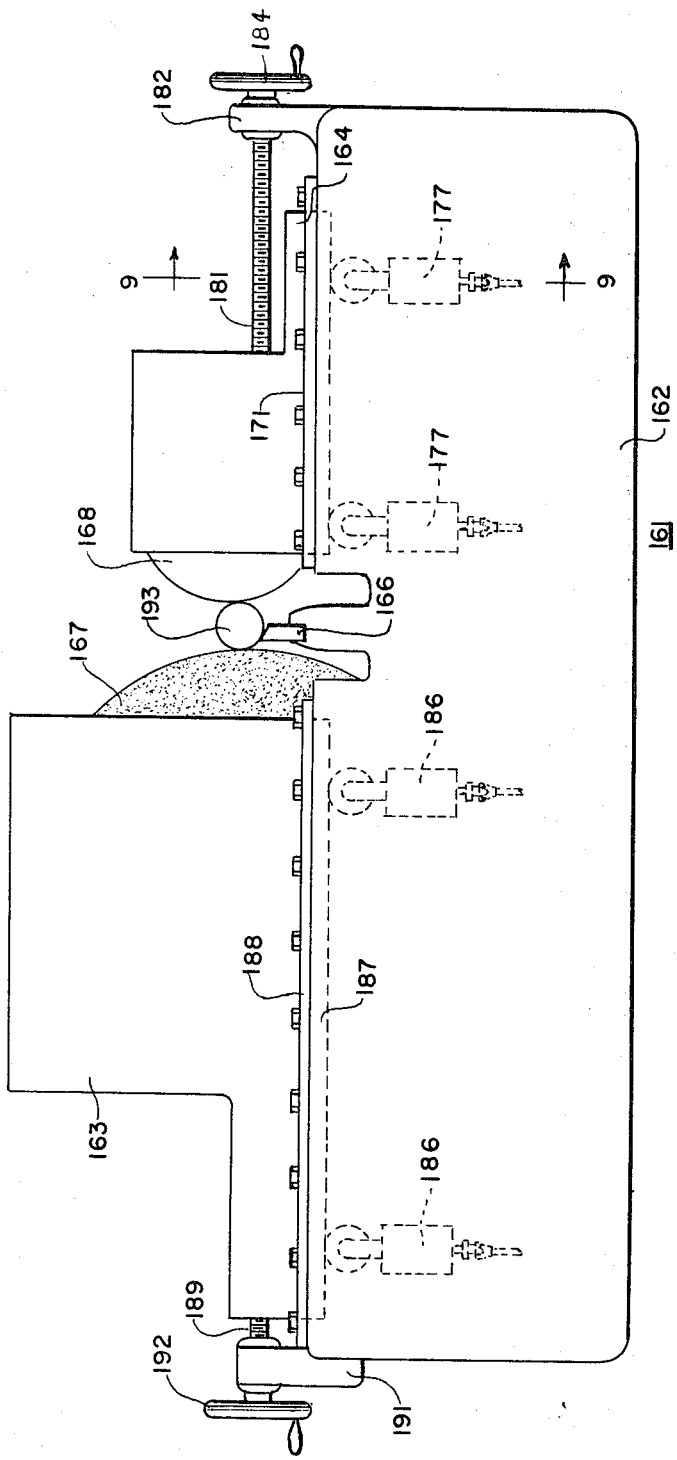

Dec. 15, 1970          R. C. FISHER          3,546,820
MACHINE TOOL WITH UPWARDLY URGED SLIDE
Filed Nov. 9, 1967                    9 Sheets-Sheet 6

INVENTOR.
ROBERT C. FISHER
BY *Pearce Schaeperklaus*

Attorneys

INVENTOR.
ROBERT C. FISHER
BY Pearce Schaeperklaus
Attorneys

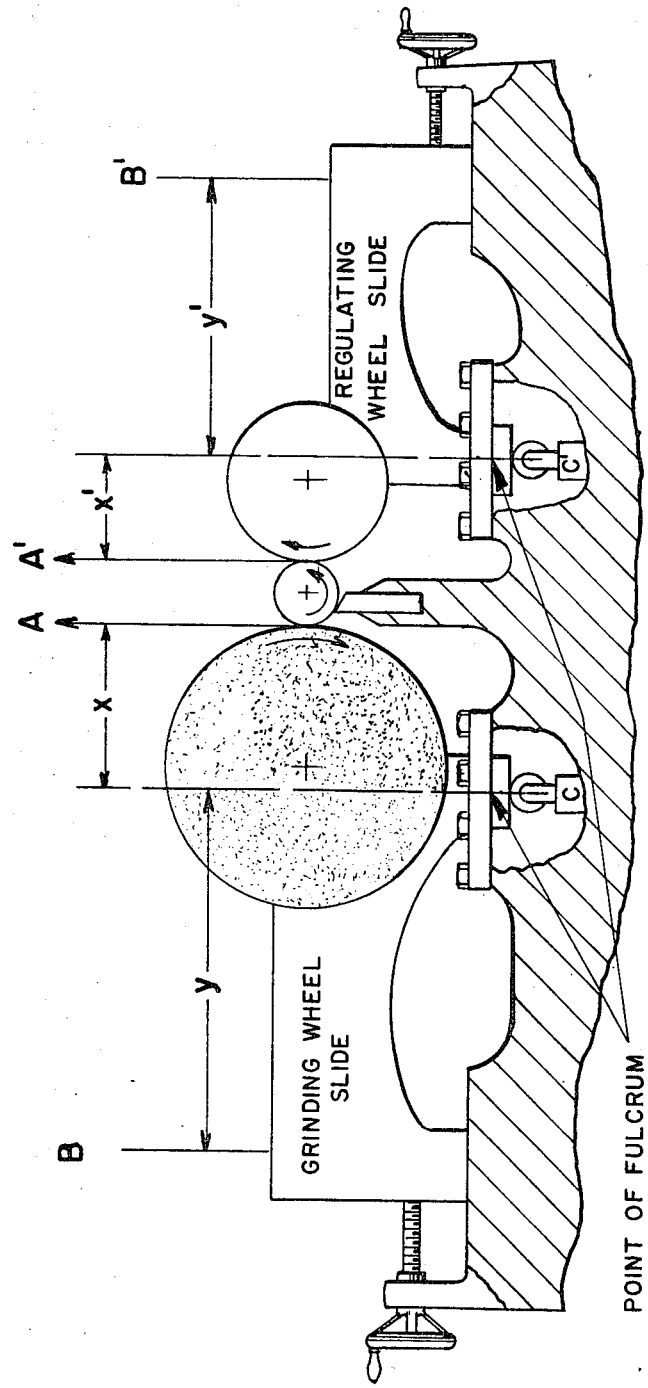
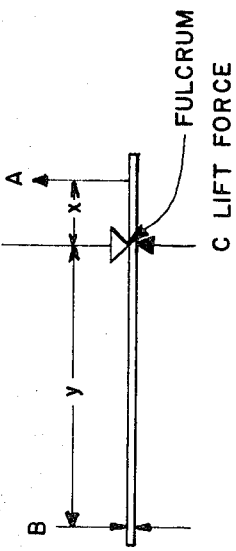
FIG. 13
FIG. 14

United States Patent Office 3,546,820
Patented Dec. 15, 1970

3,546,820
MACHINE TOOL WITH UPWARDLY URGED SLIDE
Robert C. Fisher, Milford, Ohio, assignor to Cincinnati Milacron, Inc., a corporation of Ohio
Filed Nov. 9, 1967, Ser. No. 681,815
Int. Cl. B24b 5/18; F16c 27/02
U.S. Cl. 51—103                    13 Claims

ABSTRACT OF THE DISCLOSURE

In a machine tool having a bed, a slide reciprocating on the bed toward and away from a workpiece, work engaging means on the slide engageable with the workpiece, interaction between the work engaging means and the workpiece tending to raise the slide off the bed, rails on the bed overlying guide face means on the slide, means for urging the slide upwardly to bring the faces into face-to-face frictional engagement, and means for advancing the slide to bring the work engaging means into engagement with the workpiece, the slide advancing smoothly and under a continuing friction load as the work engaging means and workpiece engage, which load increases with increasing cutting force.

---

This invention relates to machine tools. More particularly, this invention relates to grinding machines and to mechanism for guiding and advancing a slide on which a grinding wheel or the like is supported.

The slide of a grinding machine requires controlled incremental advance and retraction in order to provide proper control of grinding. However, as a grinding wheel or a regulating wheel comes into engagement with a workpiece, substantial lifting forces are impressed on the wheel and, through it, to the slide so that, although sufficient force only is used to urge the slide to advance a slight amount against the friction between slide and ways when at rest, the lifting force of the cut, raising the slide, suddenly reduces the friction load permitting a major portion of the cut force to be transmitted to the advancing mechanism.

An object of this invention is to provide a slide mounting for a grinding machine or the like which permits controlled incremental advance of a slide without vibration and with frictional dampening of slide advance which increases with increase of cut force.

A further object of this invention is to provide a slide mounting for a grinding machine or the like in which lifting forces caused by engagement of a wheel with a workpiece do not cause a sudden reduction in the effective friction load as the wheel is brought into engagement with the work.

Briefly, this invention provides a slide mounting for a grinding machine or the like in which the slide is held upwardly against horizontal rails which overlie horizontal guide faces on the slide. The slide is held upwardly with sufficient force to hold the guide faces on the slide firmly in engagement with the rails during advance and retraction of the slide with there being frictional engagement therebetween. As the slide is advanced to bring the wheel thereof into engagement with the workpiece, the effective friction load is increased so that there is a continuing friction load as the wheel and the workpiece engage, the friction load increasing with increasing cut force. The purpose of this is to counteract the cut force through slide friction and not through the advancing mechanism.

The above and other objects and features of the invention will be apparent to those skilled in the art to which this invention pertains from the following detailed description, and the drawings, in which:

FIG. 2 is a view in section on an enlarged scale taken on the line 2—2 in FIG. 1;

FIG. 4 is a view in section taken on the line 4—4 in FIG. 3;

FIG. 8 is a view in side elevation of a centerless type grinding machine constructed in accordance with another embodiment of this invention;

FIG. 13 is a schematic view of a grinding machine similar to that of FIGS. 10-12 showing force pattern thereof; and FIG. 14 is a schematic force diagram of one side of the machine shown in FIG. 13.

In the following detailed description, and the drawings, like reference characters indicate like parts.

Figure 1:
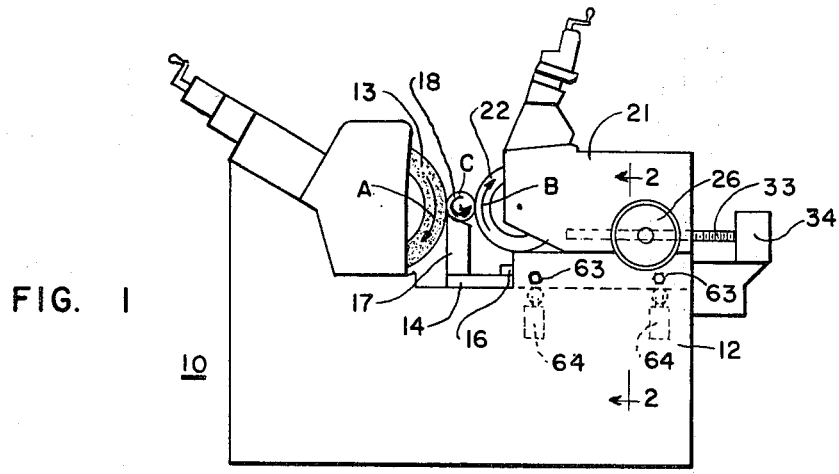
FIG. 1 is a view in front elevation of a centerless grinding machine having a slide mount constructed in accordance with an embodiment of this invention.

In FIGS. 1 and 2 is shown a centerless grinding machine 10 having a bed 12 on which a grinding wheel 13 (FIG. 1) is rotatably mounted. Motor means (not shown) is provided for driving the grinding wheel 13 in the direction of the arrow A. On the bed 12 are also mounted a lower slide 14 and an upper slide 16. The lower slide 14 carries a work support or blade 17 which underlies and supports a workpiece 18. The upper and lower slides can be advanced and retracted separately but normally are clamped together by clamp means (not shown) to move inwardly and outwardly as a unit. The upper slide 16 carries a housing 21 in which a regulating wheel 22 is rotatably mounted, the axis of the regulating wheel being substantially horizontal and extending transversely of the direction of movement of the slide. Motor means (not shown) drives the regulating wheel in the direction of the arrow B. The grinding wheel 13 is driven at a much greater speed than the regulating wheel 22 and, when the grinding wheel 13 and the regulating wheel 22 engage opposite sides of the workpiece 18, the regulating wheel serves as a brake retarding rotation of the workpiece so that the workpiece 18 rotates in the direction of the arrow C but at a lesser peripheral rate than the grinding wheel 13.

The slides are moved in and out (i.e. toward and away from the grinding wheel 13) by action of an infeed handwheel 26. The handwheel 26 drives a shaft 27 (FIG. 2) which carries a bevel gear 28. The bevel gear 28 meshes with a bevel gear 29 (FIGS. 2 and 2B) mounted on a nut 31 (FIG. 2). The nut 31 is threaded to a screw 33, which is mounted in a bracket 34 (FIG. 1) carried by the bed 12. A bracket 36 (FIG. 2B) mounted in the housing 21 causes the housing and the upper slide 16 to move with the nut 31. When the slides are clamped together, turning of the handwheel 26 advances or retracts the slides as a unit. When one slide is to be moved with relation to the other slide, the lower slide can be clamped to the bed by clamp means (not shown), and turning of the handwheel 26 advances or retracts the upper slide with respect to the lower slide. The structure described to this point is of usual construction, and unnecessary details of construction have been omitted from the drawings for clarity.

As shown in FIG. 2, the upper slide 16 is provided with outwardly extending lengthwise flanges 38 and 39 which have flat upper guide faces 41 and 42 respectively. The bed 12 includes upwardly extending portions 43 and 44 outboard of the flanges 41 and 42. Rail members 46 and 47 are attached to the flanges 41 and 42, respectively. The rail members 46 and 47 are attached to the upwardly extending portions 43 and 44 by fasteners 48. The rail members 46 and 47 have horizontal flat downwardly directed lower faces 49 and 51, respectively, against which the upper faces of the flanges 41 and 42 can engage in flatwise, face-to-face, frictional contact.

The upper slide is provided with a lengthwise slot 53 which receives a lengthwise boss 54 on the lower slide 14. The upper and lower slides are held in alignment with each other by opposed pairs of guide blocks 56, only one pair of which is shown. The blocks 56 are slidably mounted in slots 57 in the upper slide 16 for movement inwardly and outwardly. Pins 58 mounted in the blocks 56 are engaged by conical tips of adjustment screws 59 to adjust the positioning of the blocks 56. The lower slide is centered by means of opposed pairs of positioning or guide blocks 61 (only one pair of which is shown), which are slidably mounted in slots 62 in the bed 12 of the machine. Positioning screws 63 move the blocks to position the lower slide in proper centered position. The blocks 56 and 61 can be formed of appropriate wear resistant material such as one of the synthetic plastic materials commonly known as Teflon or Formica or can be formed of hard wood or the like.

Figure 2A:
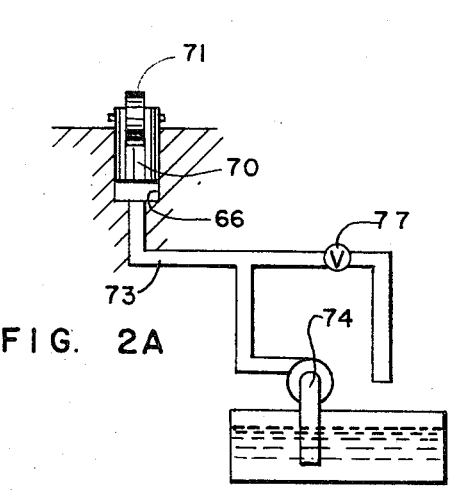
FIG. 2A is a schematic circuit diagram showing hydraulic connections to one of a plurality of cylinders of the machine shown in FIGS. 1 and 2.
Figure 2B:
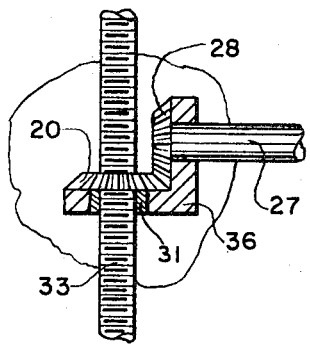
FIG. 2B is a fragmentary view in section taken on the line 2B—2B in FIG. 2.

When the regulating wheel 22 (FIG. 1) is to be brought into engagement with the workpiece 18, the slides are raised to the position shown in FIG. 2 by lifting devices 64. There can be four lifting devices each underlying and adjacent one of the four corners of the slides. Each of the lifting devices includes a cylinder 66 which is attached to the bed 12 interiorly of one of leg portions 67 and 68 of the bed. Flanges 68' (only one of which is shown) of the cylinder 66 receive screw fasteners 68" by means of which the body is attached to the leg portion. The cylinder 66 receives a piston 70 on the upper end 72 of which is journaled a roller 71. The piston is raised by fluid under pressure introduced into the cylinder 66 below the piston member 70 through an inlet line 73. As shown in FIG. 2A, fluid for the cylinder 66 is supplied by a source of fluid under pressure 74. Pressure inside the cylinder can be regulated through an adjustable relief valve 77. Sufficient pressure is introduced to the cylinders 66 to cause the rollers 71 to be raised to the position shown in FIG. 2 in which the rollers hold the flanges 38 and 39 in engagement with the rail members 46 and 47. Preferably the pressure inside the pistons can be separately adjusted. The rollers provide minimum friction below the slides. However, frictional engagement occurs between the upper faces 41 and 42 of the flanges 38 and 39 and the lower faces 49 and 51 of the rail members 46 and 47. The slides are advanced by turning of the handwheel 26. As the regulating wheel 22 (FIG. 1) comes into engagement with the workpiece 18, forces thereon due to interaction between the regulating wheel and the workpiece cause the regulating wheel 22 to be urged upwardly with the housing 21 and the slide 16. This causes an increase in the effective friction load between the faces 41 and 42 of the flanges 38 and 39 (FIG. 2) and the faces 49 and 51 of the rail members 46 and 47, and there is a continuing friction load as the wheel and the workpiece engage, which load increases with increasing cut force. Since the initial slide friction is small, the force required to position the slide is low, but friction force increases as a cut is made. The increased frictional load can be helpful in holding or locking the slide in position when grinding parts which are fed through the grinding machine. Where a heavy cut is to be made, the friction may be sufficient that it can be necessary to introduce a momentary vibration of the slide to permit positioning. This can be effected by striking the slide a mechanical blow.

Figure 3:
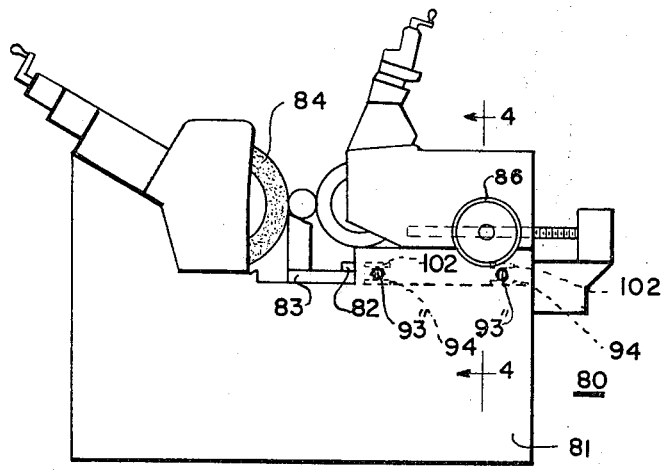
FIG. 3 is a view in front elevation of another centerless grinding machine provided with a slide mount constructed in accordance with another embodiment of this invention.

In FIGS. 3 and 4 is shown a centerless grinding machine or grinder 80 constructed in accordance with another embodiment of this invention. The grinder 80 includes a bed 81 on which an upper slide 82 and a lower slide 83 are mounted for movement toward and away from a grinding wheel 84 (FIG. 3) rotatably mounted on the bed. The slides can be moved by operation of a handwheel 86 in the same manner as the slides of the machine described hereinabove. Rails 87 and 88 (FIG. 4) attached to upstanding portions 89 and 91 of the bed overlie flanges 92 and 93 of the upper slide 82. The upper and lower slides 82 and 83 are guided in the same manner as slides described hereinabove, the lower slide 83 being guided by blocks 93' which are positioned by screws 93". The slides 82 and 83 are raised by fluid under pressure introduced into pockets 94 formed in the underside of the lower slide 83. The pockets open on an upper face 97 of a cross portion 98 of the bed. The fluid is introduced into the pockets through ports 99 in the lower slide. In addition, the fluid can be introduced into pockets 102 formed in the underside of the upper slide 82 opposite upper face portions 104 of flanges 107 and 108 of the lower slide 83. Fluid is introduced into the pockets 102 through ports 109 in the upper slide. Four pockets 94 are formed in the lower slide 83 and arranged in rectangular fashion adjacent but spaced inwardly from the corners of the lower slide 83. Similarly, four pockets 102 are formed in the upper slide 82 and arranged in rectangular fashion adjacent but spaced inwardly from corners of the upper slide 82. Pockets 102 and 94 can be connected together in pairs by upright channels 111 in the lower slide to equalize pressure therebetween, or all pockets may be controlled separately to compensate for unbalanced static slide loads.

When the machine 80 is in normal operation, and the slides 82 and 83 are clamped to move together, fluid need only be introduced into the pockets 94 to raise the slides from the position shown in FIG. 4 to a position in which upper faces 112 and 113 of the flanges 92 and 93, respectively, engage under faces 114 and 116 of the rails 87 and 88. However, when one slide is being moved with respect to the other slide, fluid can be introduced into the pockets 102 to raise the upper slide away from the lower slide. There can be four sets of pockets, each set being adjacent one of the corners of the slides.

Fluid can be supplied to each of the pockets by means of a constant flow pump or choke system (not shown) or the like which maintains pressure in the pockets with there being a continuous flow from the pockets between interfaces surrounding the pocket. A slot 118 is formed in the bed between the pockets 94 through which fluid can be withdrawn.

Figure 6:
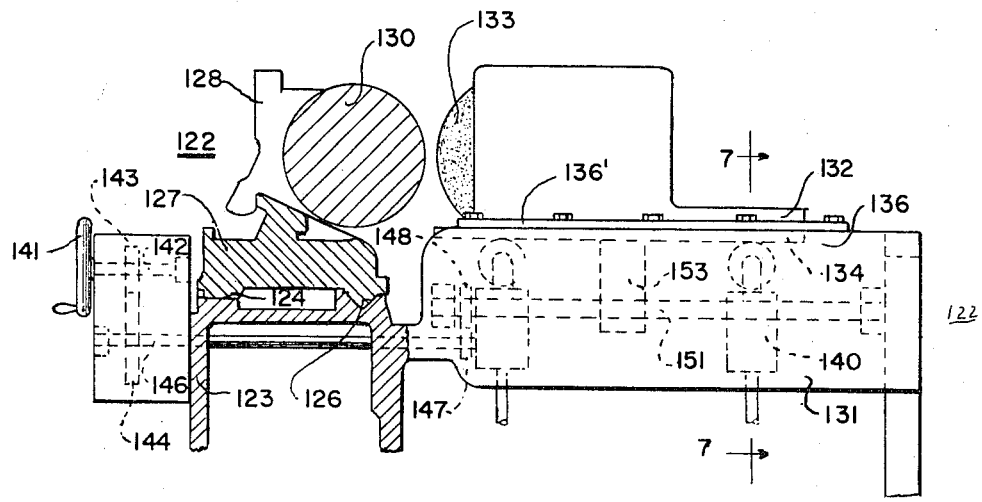
FIG. 6 is a view in section on an enlarged scale taken on the line 6—6 in FIG. 5.
Figure 7:
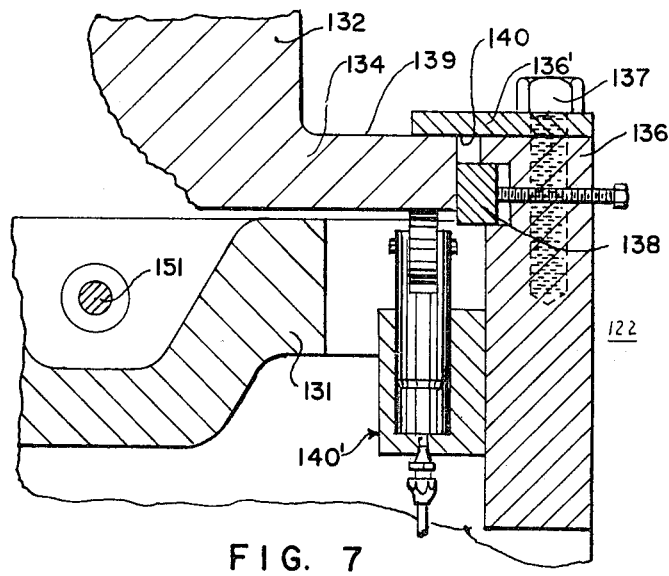
FIG. 7 is a fragmentary view in section taken on line 7—7 in FIG. 6.
Figure 5:
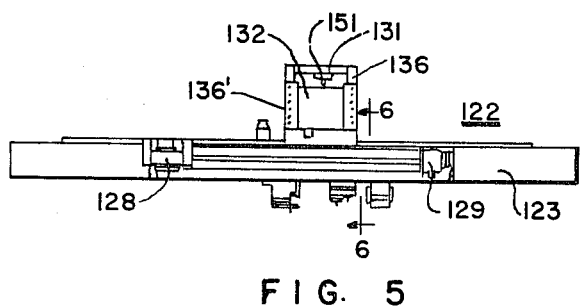
FIG. 5 is a plan view of a center type or plain grinding machine provided with a slide mount constructed in accordance with another embodiment of this invention.

In FIGS. 5, 6 and 7 is shown a plain or center type grinding machine 122 which has a bed 123 (FIG. 6) having ways 124 and 126 on which a table 127 can move. Work supports 128 and 129 are mounted on the table 127 and can rotatably support a workpiece 130 (FIG. 6). Motor means (not shown in detail) is provided in one of the work supports rotating the workpiece about its axis. A transverse bed portion 131 extends transversely of the bed. A cross slide or carriage 132 is mounted on the transverse bed portion 131. A grinding wheel 133 is rotatably mounted on the cross slide and the axis of the grinding wheel is in substantially the same horizontal plane as the axis of the workpiece. Drive motor means on the cross slide (not shown in detail) turns the grinding wheel 133 about its axis in such a direction that a workpiece engaging portion thereof moves downwardly. The cross slide 132 has outwardly extending flanges 134, only one of which is shown in FIG. 6. The transverse bed portion has upwardly extending projecting portions 136 outboard of the flanges 134. Rail members 136' are attached to upper ends of the portions 136 by fasteners 137. The cross slide 132 is guided by guide blocks 138 (only one of which is shown) which operate like the guide blocks already described to guide the carriage for movement toward and away from the axis of the workpiece. The cross slide is raised to bring an upper face 139 of each flange 134 into face-to-face frictional engagement with an under face 140 of one of the rails 136 by lifting devices 140', which are similar in construction to the lifting devices described hereinbefore.

The slide 132 is advanced to bring the grinding wheel 133 (FIG. 6) into engagement with the workpiece 130 by turning of a handwheel 141. A shaft 142, which is driven by the handwheel 141, carries a gear 143. The gear 143 meshes with a gear 144 on a shaft 146. Mating gears 147 and 148 on the shaft 146 and on a screw 151 cause the screw to be driven as the handwheel is turned. A downward extension 153 on the slide is threaded to the screw 151 to cause the carriage to move back and forth as the screw 151 is turned.

Figure 9:
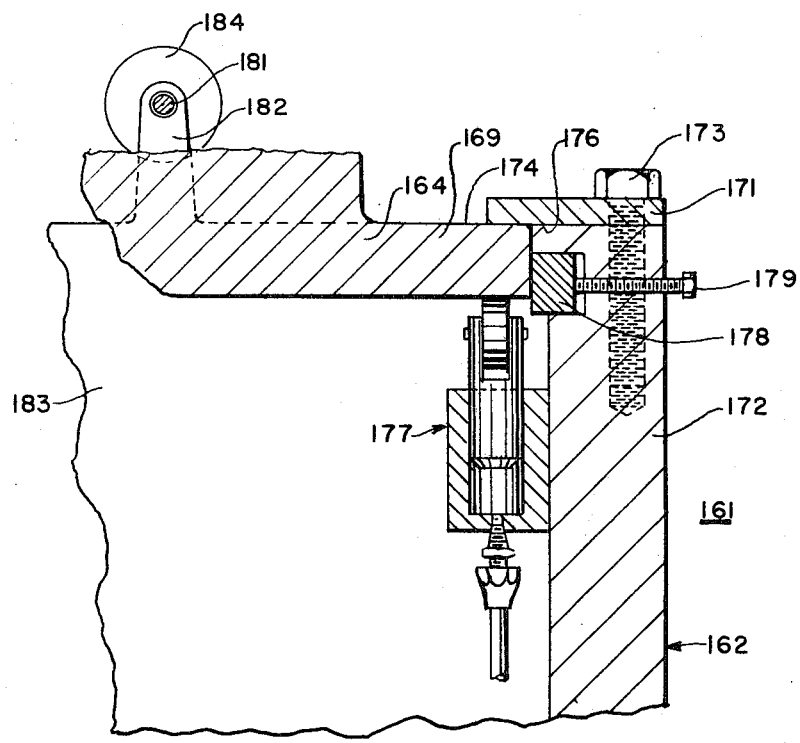
FIG. 9 is a view in section taken on the line 9—9 in FIG. 8.

In FIGS. 8 and 9 is shown a centerless grinding machine 161 constructed in accordance with another embodiment of this invention which includes a bed 162 on which a grinding wheel slide 163 (FIG. 8) and a regulating wheel slide 164 are mounted for movement toward and away from a stationary work support 166. A grinding wheel 167 is rotatably mounted on the grinding wheel slide 163. A regulating wheel 168 is rotatably mounted on the regulating wheel slide 164. Appropriate drive means (not shown) is provided in each slide for driving the wheels. As shown in FIG. 9, the regulating slide 164 includes outwardly extending flanges 169 (only one of which is shown). Rails 171 (only one of which is shown) are mounted on bed side members 172 (only one of which is shown) and are attached thereto by fasteners 173. The slide 164 can be raised to bring upper flange faces 174 (only one shown) into engagement with downwardly facing rail faces 176 (only one shown) by lifting devices 177 which are similar in construction and operation to the lifting devices already described. The slide 164 is positioned by guide blocks 178 actuated by screws 179 threaded in the bed side members. A screw 181 serves to advance and retract the slide 164. The screw 181 is rotatably mounted in a screw mount bracket 182 attached to a cross member 183 of the bed. The screw 181 is threaded in the slide 164. A handwheel 184 mounted on the screw 181 serves for turning same.

The grinding wheel slide 163 can be raised by lifting devices 186 (FIG. 8) to cause flanges 187 (not shown in detail) thereof to engage rails 188 (only one of which is shown) in the same manner as the other lifting devices raise slides. A screw 189 rotatably mounted in a bracket 191 attached to the bed 162 is threaded in the grinding wheel slide 163. Turning of a handwheel 192 mounted on the screw 189 advances the grinding wheel slide 163 toward and away from the work holder 166.

A workpiece 193 can be mounted on the work holder 166, and the grinding wheel 167 and regulating wheel 168 can be advanced into engagement therewith to machine the workpiece 193. Since the slides are raised into engagement with the rails, force exerted on the slides tending to raise them adds to the frictional load as the wheels are advanced in the manner already described in connection with other forms.

Figure 10:
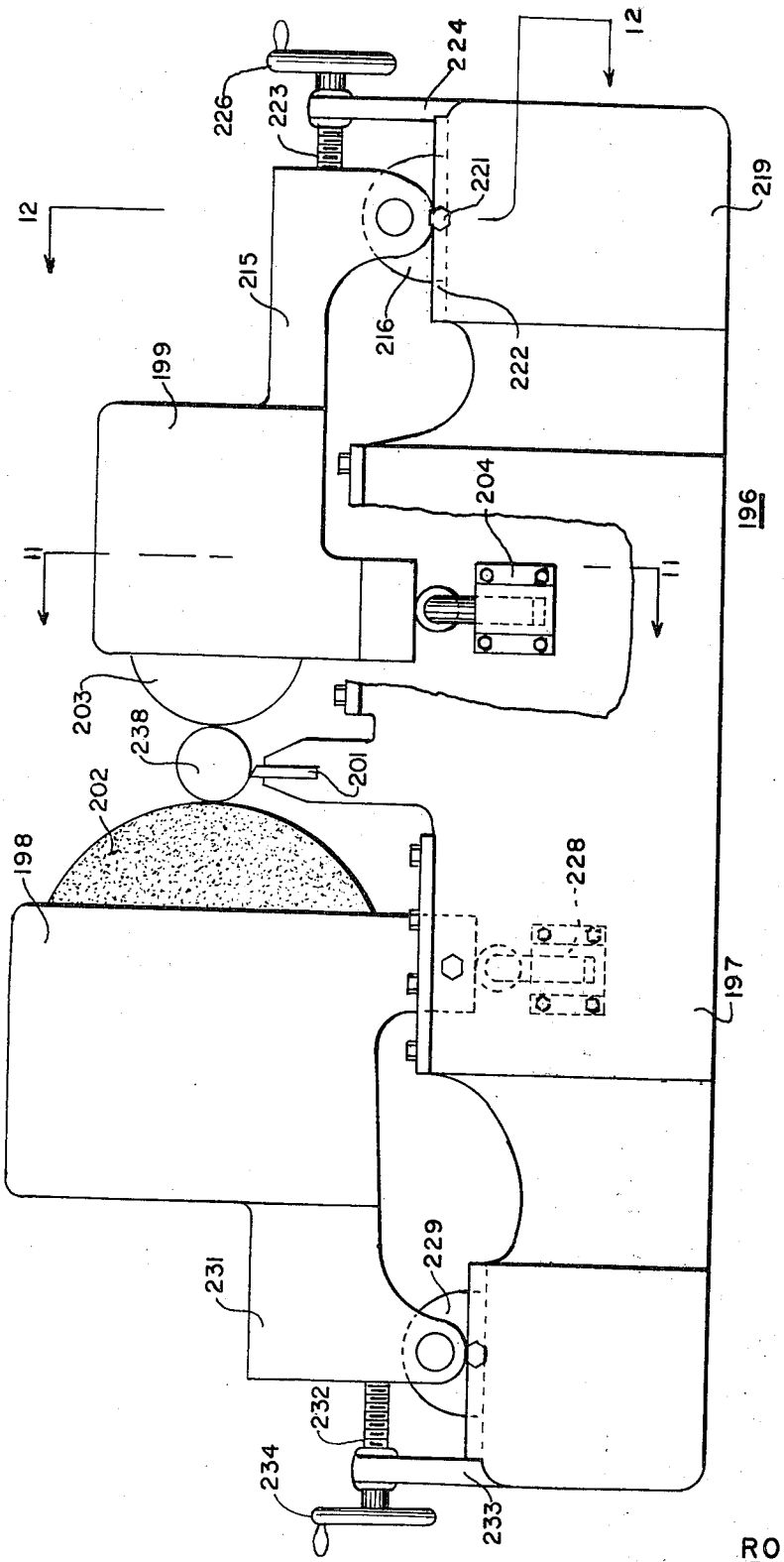
FIG. 10 is a somewhat schematic view in side elevation partially broken away to reveal internal construction of a centerless grinding machine constructed in accordance with another embodiment of this invention.
Figure 12:
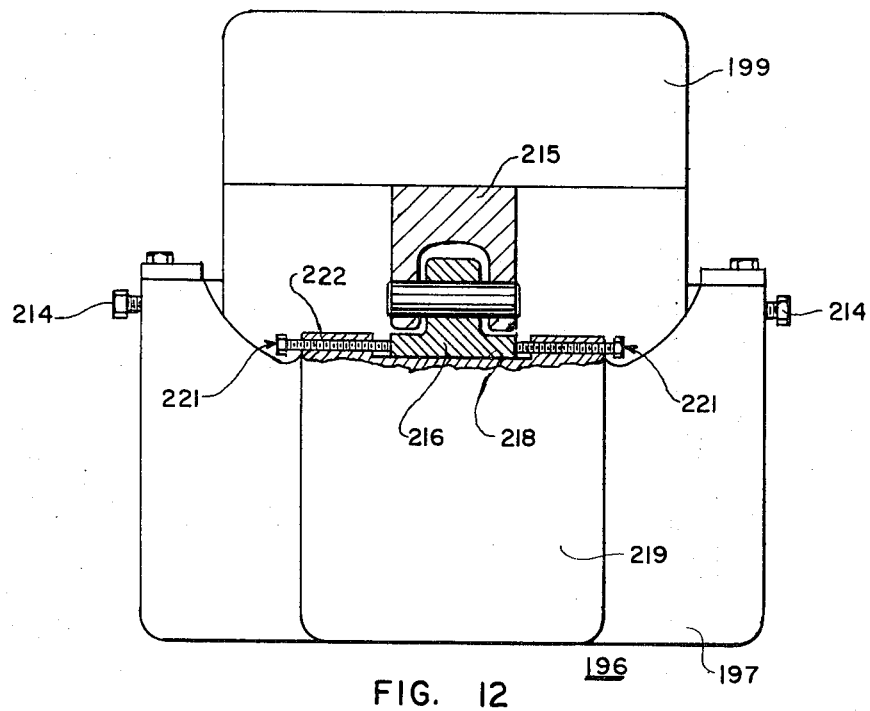
FIG. 12 is a view in section taken on the line 12—12 in FIG. 10.
Figure 11:
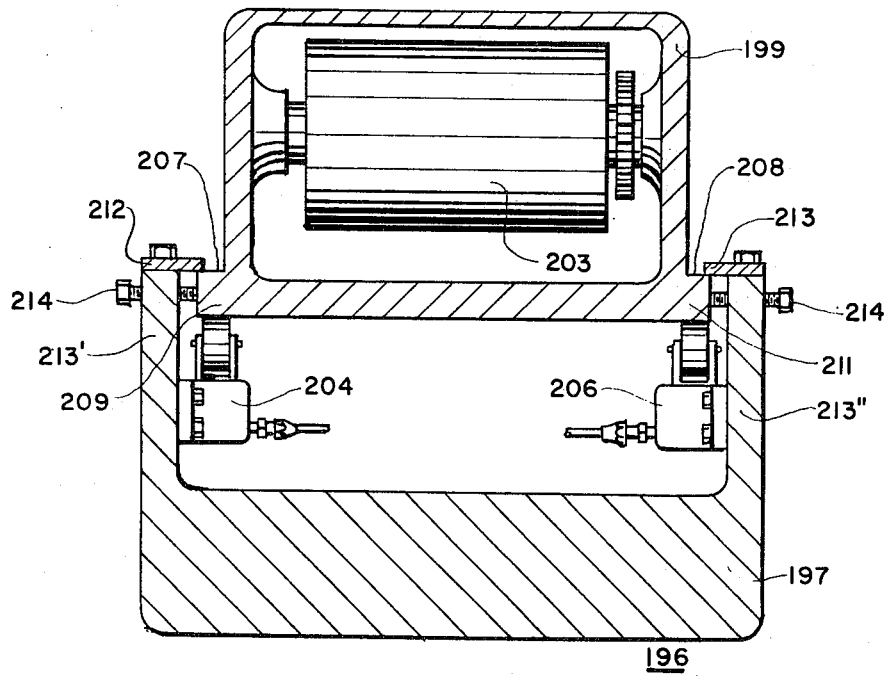
FIG. 11 is a view in section taken on the line 11—11 in FIG. 10.

In FIGS. 10 to 12 inclusive is shown a centerless grinding machine 196 constructed in accordance with another embodiment of this invention, which includes a bed 197 on which a grinding wheel slide 198 (FIG. 10) and a regulating wheel slide 199 are slidably mounted for movement toward and away from a stationary work holder 201. A grinding wheel 202 is rotatably monted in the grinding wheel slide 198, and a regulating wheel 203 is mounted in the regulating wheel slide 199. As shown in FIGS. 10 and 11, a forward end portion of the regulating wheel slide 199 adjacent and underlying the regulating wheel 203 can be lifted by lifting devices 204 and 206 to raise upper faces 207 and 208 of flanges 209 and 211, respectively, of the slide 199 into engagement with rails 212 and 213 mounted on side walls 213' and 213" of the bed. The forward end portion of the slide 199 is guided by screws 214 threaded in the side walls 213' and 213" respectively. The screws are provided with tip portions of appropriate bearing material. A rearward extension 215 of the slide 199 can be supported by a foot or shoe 216 which can be pivotally mounted thereon. As shown in FIG. 12, the shoe 216 rides on a flat upper face 218 of a rearward extension 219 of the bed. Positioning screws 221 adjustably center the shoe 216 for guiding the rear portion of the slide 199. The positioning screws 221 are threaded in upward extensions 222 of the bed extension 219 on opposite sides of the foot 216. The positioning screws 221 can be provided with appropriate bearing ends engageable with side faces of the foot 216. A slide advancing screw 223 (FIG. 10) is rotatably mounted in a bracket 224 mounted on the bed extension 219. The screw 223 is threaded in the slide extension 215 so that turning of a handwheel 226 mounted on the screw 223 causes advance of the regulating wheel slide 199 toward and away from the work holder 201.

The grinding wheel slide 198 is generally similar in construction to the regulating wheel slide 199 already described. The inner end of the grinding wheel slide 198 can be raised by lifting devices 228 mounted on the bed 197 adjacent and underlying the grinding wheel end of the slide 198. A foot or shoe 229 can support a rearward extension 231 of the grinding wheel slide 198. A slide advancing screw 232 rotatably mounted in a bracket 233 supported on the bed 197 and threaded to the rearward slide extension 231 can be turned by means of a handwheel 234 to advance the grinding wheel slide 198 and the grinding wheel 202 toward and away from the work holder 201.

The slides 198 and 199 can be so constructed that, when the machine is at rest, a portion of the weight of the slides is supported by the feet 229 and 216, but the load on the feet can be relatively small. When the grinding wheel 202 and the regulating wheel 203 engage a work piece 238 mounted on the work holder 201, the load on the feet 229 and 216 can be increased but, since the feet rest on bed portions, it is not necessary to increase lifting forces on lifting devices because of increase in load as may be necessary with the other forms of devices.

In FIGS. 13 and 14, force diagrams are shown for the type of machine shown in FIGS. 10–12 inclusive. The vectors A and A' shown are the tangential forces the part exerts on the grinding wheel and regulating wheel. The rapid speed of the grinding wheel tends to over-drive the part which, in turn, tends to over-drive the regulating wheel. Thus, the vector A' acts in the direction shown on the regulating wheel at any time grinding is taking place. There are always the tangential forces A and A' being exerted in the directions shown when grinding is taking place. The part also exerts normal forces on the regulating wheel and grinding wheel, but these are taken care of by slide friction and compression of feed screw.

In the grinding machines of the past, the slides are weighted down or clamped on the ways. As heavier cuts are taken, the vector A' gets larger on the regulating wheel slide and the vector A gets larger on the grinding wheel slide of centerless grinders, and the grinding wheel slide on centertype grinders. This tends to lift the slides from the ways.

The present invention utilizes this upward force by clamping up in the beginning. As a result, during a heavy cut the upward force tends to aid the clamping action rather than tending to lift away from the clamping. Therefore, during a heavy cut there is a heavy clamping force, and during a light cut, there is a light clamping force rather than oppositely as existed in the past.

The vector A tends to force the opposite end of the grinding wheel slide and regulating wheel slide downward. However, this force may get very great on extremely heavy cuts, so the embodiment shown in FIGS. 10, 11 and 12 makes provision for this downward force. That embodiment shows the end of the slide close to the workpiece clamped up, and that end further away resting down due to the weight of the slide. Accordingly, as the cut forces increase, the front of the slide is clamped upward with greater force and the rear of the slide is clamped downward with greater force.

The machine tool constructions illustrated in the drawings and described above are subject to structural change without departing from the spirit and scope of the appended claims.

Having described my invention, what I claim as new and desire to secure by Letters Patent is:

1. In a machine tool the combination comprising a bed, means for supporting a workpiece adjacent the bed, a slide mounted on the bed for reciprocation toward and away from the workpiece, a work engaging member mounted on the slide and extending substantially horizontally and transversely of the direction of reciprocation of the slide, rail means mounted on the bed and having a downwardly directed face, an upwardly directed guide face on the slide engageable with the first mentioned face, resilient means for raising the slide with sufficient force to bring said faces into face-to-face frictional engagement while permitting frictional sliding therebetween and for resiliently holding the slide with the faces in engagement and retaining the slide in spaced relation to any upwardly directed face of the bed, and means for advancing the slide to bring the work engaging member into engagement with the workpiece, interaction between the work engaging member and the workpiece tending to raise the slide and increasing the frictional force between the faces.

2. A combination as in claim 1 wherein the work engaging member is a rotary cutting tool and means is provided for rotating the cutting tool in such a direction that the work engaging portion moves downwardly.

3. A combination as in claim 2 wherein the machine tool is a center type grinding machine, the workpiece supporting means supports the workpiece in horizontal position, the downwardly directed face on the rail means is substantially horizontal, and the axis of the cutting tool and the axis of the workpiece are in a common substantially horizontal plane.

4. A combination as in claim 1 wherein the machine tool is a centerless grinding machine having a grinding wheel mounted on the bed, the work engaging member mounted on the slide being a regulating wheel, the grinding wheel rotating in such a direction that a work engaging portion thereof moves downwardly, the regulating wheel braking rotation of the workpiece when the workpiece is engaged between the grinding wheel and the regulating wheel.

5. A combination as in claim 1 wherein the means for raising the slide includes upright cylinders underlying the slide adjacent corners thereof, pistons in the cylinders, rollers supported on the pistons engageable with the slide, and means for introducing fluid under pressure into the cylinders beneath the pistons to cause the pistons and rollers to move upwardly raising the slide.

6. A combination as in claim 1 wherein the means for raising the slide includes pockets underlying the slide adjacent corners of the slide and means for introducing fluid under pressure into the pockets to raise the slide.

7. A combination as in claim 1 wherein the downwardly directed face on the rail means is substantially horizontal.

8. In a machine tool the combination comprising a bed, means for supporting a workpiece adjacent the bed, a slide reciprocably mounted on the bed for movement toward and away from a workpiece member mounted on the workpiece support, a work engaging member on the slide engageable with the workpiece member, means for rotating one of said members in such a direction that interaction therebetween tends to raise the slide off the bed, track means on the bed having a downwardly directed face overlying a guide face on the slide, resilient means for urging the slide upwardly to bring the faces into face-to-face frictional engagement and retaining the slide in spaced relation to any upwardly directed face of the bed, and means for advancing the slide to bring the work engaging member into engagement with the workpiece member.

9. A combination as in claim 8 wherein the slide carries a shoe remote from the work engaging member, the shoe resting on the bed, interaction between the members tending to increase the load of the slide on the shoe.

10. A centerless grinding machine which comprises a bed, a stationary workpiece support mounted on the bed, a pair of slides, each of the slides being reciprocably mounted on the bed for movement toward and away from the workpiece support, a work engaging member on each slide engageable with a workpiece member mounted on the workpiece support, one said work engaging member being a grinding wheel, means for rotating the wheel in such a manner that interaction thereof with the workpiece tends to raise at least one of the slides off the bed, track means on the bed having a downwardly directed face overlying a guide face on said one of the slides, resilient means for urging said one of the slides upwardly to bring the faces into face-to-face frictional engagement and retaining the slide in spaced relation to any upwardly directed face of the bed, and means for advancing the slides to bring the work engaging members into engagement with the workpiece.

11. A centerless grinding machine as in claim 10 where interaction of the work engaging members with the workpiece tends to raise both of the slides off the bed, the track means on the bed overlies guide faces on both of the slides, and resilient means is provided for urging both of the slides upwardly to bring the faces into face-to-face frictional engagement and retaining the slides in spaced relation to any upwardly directed face of the bed.

12. A centerless grinding machine as in claim 11 wherein at least one of the slides carries a shoe member remote from the work engaging member thereof, the shoe supported on the bed, interaction between the work engaging members and the workpiece tending to increase the load of said one of the slides on the shoe.

13. A combination as in claim 1 wherein means is provided for moving the slide transversely of the direction of advance thereof for positioning the slide when the faces are in engagement.

References Cited

UNITED STATES PATENTS

| | | | |
|---|---|---|---|
| 1,777,607 | 10/1930 | Ekholm et al. | 51—103 |
| 1,787,337 | 12/1930 | Booth | 51—103 |
| 1,903,865 | 4/1933 | Johnson. | |
| 2,904,936 | 9/1959 | Veith | 51—103 |

FOREIGN PATENTS

| | | | |
|---|---|---|---|
| 365,738 | 1/1932 | Great Britain | 308—3 |

LESTER M. SWINGLE, Primary Examiner

U.S. Cl. X.R.

3—308